United States Patent
Agostinelli et al.

(10) Patent No.: US 6,702,442 B2
(45) Date of Patent: Mar. 9, 2004

(54) MONOCENTRIC AUTOSTEREOSCOPIC OPTICAL APPARATUS USING RESONANT FIBER-OPTIC IMAGE GENERATION

(75) Inventors: John A. Agostinelli, Rochester, NY (US); Joshua M. Cobb, Victor, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/095,341

(22) Filed: Mar. 8, 2002

(65) Prior Publication Data

US 2003/0169405 A1 Sep. 11, 2003

(51) Int. Cl.$^7$ ............................................... G03B 21/00
(52) U.S. Cl. ............................................ 353/7; 353/10
(58) Field of Search .............................. 353/7, 8, 9, 10; 349/15; 359/462, 464, 471, 472, 475, 477

(56) References Cited

U.S. PATENT DOCUMENTS

| | | |
|---|---|---|
| 3,748,015 A | 7/1973 | Offner |
| 4,124,978 A | 11/1978 | Wagner |
| 4,331,390 A | 5/1982 | Shafer |
| 4,623,223 A | 11/1986 | Kempf |
| 4,799,763 A | 1/1989 | Davis et al. |
| 4,854,688 A | 8/1989 | Hayford et al. |
| 5,206,499 A | 4/1993 | Mantravadi et al. |
| 5,255,028 A | 10/1993 | Biles |
| 5,319,968 A | 6/1994 | Billing-Ross et al. |
| 5,572,229 A | 11/1996 | Fisher |
| 5,671,992 A | 9/1997 | Richards |
| 5,908,300 A | 6/1999 | Walker et al. |
| 5,940,564 A | 8/1999 | Jewell |
| 6,034,717 A | 3/2000 | Dentinger et al. |
| 6,294,775 B1 * | 9/2001 | Seibel et al. ............. 250/208.1 |
| 6,511,182 B1 * | 1/2003 | Agostinelli et al. ............ 353/7 |
| 6,550,918 B1 * | 4/2003 | Agostinelli et al. ............ 353/7 |

OTHER PUBLICATIONS

G.J. Kintz; Autostereoscopic Properties of Spherical Panaramic Virtual Displays; SID 99 Digest. pp. 1000–1003.
S.A. Benton, T.E. Slowe, A.B. Kropp, and S.L. Smith; Micropolarizer–Based Multiple–Viewer Autostereoscopic Display; Stereoscopic Displays and Virtual Reality Systems VI, SPIE, Jan. 1999, pp. 1–8.
S. McKay, G. Mair, S. Mason, and K. Revie; Membrane Mirror Based Autostereoscopic Display for Tele–Operation and Telepresence Applications; Stereoscopic Displays and Virtual Reality Systems VII, Proceedings of SPIE, vol. 3757, pp. 198–207.
W. Smith; Modern Optical Engineering, The Design of Optical Systems; pp. 42–45.
E. Scibel, Q. Smithwick, C. Brown, P. Reinhall; Single Fiber Flexible Endoscope: General Design for Small Size, High Resolution, and Wide Field of View; Proceedings of SPIE, vol. 4158 (2001), pp. 29–39.

* cited by examiner

*Primary Examiner*—Russell Adams
*Assistant Examiner*—Andrew Sever
(74) *Attorney, Agent, or Firm*—Nelson Adrian Blish

(57) ABSTRACT

A substantially monocentric arrangement of optical components provides stereoscopic display of a virtual image, electronically scanned by resonant actuation of a resonant fiber scanner (137) using a flexible optical waveguide and projected, as a real intermediate image, near the focal surface (22) of a curved mirror (24) by means of a ball lens assembly (30). To form each left and right intermediate image component, separate left and right image generation systems (70) each comprise a resonant fiber scanner (137) that itself comprises a resonant cantilever portion (139) of optical fiber (138) that directs a modulated beam onto a curved surface (40) for projection by a ball lens assembly (30). A monocentric arrangement of optical components images the left and right scanning ball lens pupil at the corresponding left and right viewing pupil (14) of the observer (12) and essentially provides a single center of curvature for projection components. Use of such a monocentric arrangement with a curved intermediate image source and ball lens assemblies (30) provides an exceptionally wide field of view with large viewing pupils (14).

171 Claims, 7 Drawing Sheets

MONOCENTRIC AUTOSTEREOSCOPIC OPTICAL APPARATUS USING RESONANT FIBER-OPTIC IMAGE GENERATION

CROSS REFERENCE TO RELATED APPLICATIONS

Reference is made to commonly-assigned copending U.S. patent application Ser. No. 09/738,747, filed Dec. 15, 2000, entitled A MONOCENTRIC AUTOSTEREOSCOPIC OPTICAL APPARATUS AND METHOD, by Kessler et al.; U.S. patent application Ser. No. 09/854,699, filed May 14, 2001, entitled ADAPTIVE AUTOSTEREOSCOPIC DISPLAY SYSTEM, by Covannon et al.; and U.S. patent application Ser. No. 10/010,500, filed Nov. 13, 2001, entitled A MONOCENTRIC AUTOSTEREOSCOPIC OPTICAL APPARATUS USING A SCANNED LINEAR IMAGE SOURCE, by Agostinelli et al., the disclosures of which are incorporated herein.

FIELD OF THE INVENTION

This invention generally relates to autostereoscopic display systems for viewing electronically generated images and more particularly relates to an apparatus and method for generating left- and right-eye images using a resonant fiber-optic member to form an image, with a monocentric arrangement of optical components to provide a very wide field of view and large exit pupils.

BACKGROUND OF THE INVENTION

The potential value of autostereoscopic display systems is widely appreciated particularly in entertainment and simulation fields. Autostereoscopic display systems include "immersion" systems, intended to provide a realistic viewing experience for an observer by visually surrounding the observer with a 3-D image having a very wide field of view. As differentiated from the larger group of stereoscopic displays that include it, the autostereoscopic display is characterized by the absence of any requirement for a wearable item of any type, such as goggles, headgear, or special glasses, for example. That is, an autostereoscopic display attempts to provide "natural" viewing conditions for an observer.

In an article in *SID 99 Digest*, "Autostereoscopic Properties of Spherical Panoramic Virtual Displays", G. J. Kintz discloses one approach to providing autostereoscopic display with a wide field of view. Using the Kintz approach, no glasses or headgear are required. However, the observer's head must be positioned within a rapidly rotating spherical shell having arrays of LED emitters, imaged by a monocentric mirror, to form a collimated virtual image. While the Kintz design provides one solution for a truly autostereoscopic system having a wide field of view, this design has considerable drawbacks. Among the disadvantages of the Kintz design is the requirement that the observer's head be in close proximity to a rapidly spinning surface. Such an approach requires measures to minimize the likelihood of accident and injury from contact with components on the spinning surface. Even with protective shielding, proximity to a rapidly moving surface could, at the least, cause the observer some apprehension. In addition, use of such a system imposes considerable constraints on head movement.

One class of autostereoscopic systems that operates by imaging the exit pupils of a pair of projectors onto the eyes of an observer is as outlined in an article by S. A. Benton, T. E. Slowe, A. B. Kropp, and S. L. Smith, "Micropolarizer-based multiple-viewer autostereoscopic display", in *Stereoscopic Displays and Virtual Reality Systems VI*, SPIE, January, 1999. Pupil imaging, as outlined by Benton in the above-mentioned article, can be implemented using large lenses or mirrors. An observer whose eyes are coincident with the imaged pupils can view a stereoscopic scene without crosstalk, without wearing eyewear of any kind.

It can be readily appreciated that the value and realistic quality of the viewing experience provided by an autostereoscopic display system using pupil imaging is enhanced by presenting the 3-D image with a wide field of view and large exit pupil. Such a system is most effective for immersive viewing functions if it allows an observer to be comfortably seated, without constraining head movement to within a tight tolerance and without requiring the observer to wear goggles or other device. For fully satisfactory 3-D viewing, such a system should provide separate, high-resolution images to right and left eyes. It can also be readily appreciated that such a system is most favorably designed for compactness, to create an illusion of depth and width of field, while occupying as little actual floor space and volume as is possible. For the most realistic viewing experience, the observer should be presented with a virtual image, disposed to appear a large distance away.

It is also known that conflict between depth cues associated with vergence and accommodation can adversely impact the viewing experience. Vergence refers to the degree at which the observer's eyes must be crossed in order to fuse the separate images of an object within the field of view. Vergence decreases, then vanishes as viewed objects become more distant. Accommodation refers to the requirement that the eye lens of the observer change shape to maintain retinal focus for the object of interest. It is known that there can be a temporary degradation of the observer's depth perception when the observer is exposed for a period of time to mismatched depth cues for vergence and accommodation. It is also known that this negative effect on depth perception can be mitigated when the accommodation cues correspond to distant image position.

An example of a conventional autostereoscopic display unit is disclosed in U.S. Pat. No. 5,671,992 (Richards), at which a seated observer experiences apparent 3-D visual effects created using images generated from separate projectors, one for each eye, and directed to the observer using an imaging system comprising a number of mirrors.

Conventional solutions for stereoscopic imaging have addressed some of the challenges noted above, but there is room for improvement. For example, some early stereoscopic systems employed special headwear, goggles, or eyeglasses to provide the 3-D viewing experience. As just one example of such a system, U.S. Pat. No. 6,034,717 (Dentinger et al.) discloses a projection display system requiring an observer to wear a set of passive polarizing glasses in order to selectively direct the appropriate image to each eye for creating a 3-D effect.

Certainly, there are some situations for which headgear of some kind can be considered appropriate for stereoscopic viewing, such as with simulation applications. For such an application, U.S. Pat. No. 5,572,229 (Fisher) discloses a projection display headgear that provides stereoscopic viewing with a wide field of view. However, where possible, there are advantages to providing autostereoscopic viewing, in which an observer is not required to wear any type of device, as was disclosed in the device of U.S. Pat. No. 5,671,992. It would also be advantageous to allow some degree of freedom for head movement. In contrast, U.S. Pat.

No. 5,908,300 (Walker et al.) discloses a hang-gliding simulation system in which an observer's head is maintained in a fixed position. While such a solution may be tolerable in the limited simulation environment disclosed in the Walker et al. patent, and may simplify the overall optical design of an apparatus, constraint of head movement would be a disadvantage in an immersion system. Notably, the system disclosed in the Walker et al. patent employs a narrow viewing aperture, effectively limiting the field of view. Complex, conventional projection lenses, disposed in an off-axis orientation, are employed in the device disclosed in U.S. Pat. No. 5,908,300, with scaling used to obtain the desired output pupil size.

A number of systems have been developed to provide stereoscopic effects by presenting to the observer the combined image, through a beamsplitter, of two screens at two different distances from the observer, thereby creating the illusion of stereoscopic imaging, as is disclosed in U.S. Pat. No. 5,255,028 (Biles). However, this type of system is limited to small viewing angles and is, therefore, not suitable for providing an immersive viewing experience. In addition, images displayed using such a system are real images, presented at close proximity to the observer, and thus likely to introduce the vergence/accommodation problems noted above.

It is generally recognized that, in order to minimize vergence/accommodation effects, a 3-D viewing system should display its pair of stereoscopic images, whether real or virtual, at a relatively large distance from the observer. For real images, this means that a large display screen must be employed, preferably placed a good distance from the observer. For virtual images, however, a relatively small curved mirror can be used as is disclosed in U.S. Pat. No. 5,908,300 (Walker et al.). The curved mirror acts as a collimator, providing a virtual image at a large distance from the observer. Another system for stereoscopic imaging is disclosed in "Membrane Mirror Based Autostereoscopic Display for Tele-Operation and Telepresence Applications", in Stereoscopic Displays and Virtual Reality Systems VII, Proceedings of SPIE, Volume 3957 (McKay, Mair, Mason, Revie) which uses a stretchable membrane mirror. Although the apparatus disclosed in the McKay article provides a small exit pupil, it is likely that this pupil could be enlarged somewhat simply by scaling the projection optics. However, the apparatus disclosed in the McKay article has limited field of view, due to the use of conventional projection optics and due to dimensional constraints that limit membrane mirror curvature.

Curved mirrors have also been used to provide real images in stereoscopic systems, where the curved mirrors are not used as collimators. Such systems are disclosed in U.S. Pat. Nos. 4,623,223 (Kempf); and 4,799,763 (Davis et al.) for example. However, systems such as these are generally suitable where only a small field of view is needed.

Notably, existing solutions for stereoscopic projection project images onto a flat screen, even where that image is then reflected from a curved surface. This can result in undesirable distortion and other image aberration, constraining field of view, and limiting image quality overall.

From an optical perspective, it can be seen that there would be advantages to autostereoscopic design using pupil imaging. A system designed for pupil imaging must provide separate images to the left and right pupils correspondingly and provide the most natural viewing conditions, eliminating any need for goggles or special headgear. In addition, it would be advantageous for such a system to provide the largest possible pupils to the observer, so as to allow some freedom of movement, and to provide an ultra-wide field of view. It is recognized in the optical arts that each of these requirements, by itself, can be difficult to achieve. An ideal autostereoscopic imaging system must meet the challenge for both requirements to provide a more fully satisfactory and realistic viewing experience. In addition, such a system must provide sufficient resolution for realistic imaging, with high brightness and contrast. Moreover, the physical constraints presented by the need for a system to have small footprint, and dimensional constraints for interocular separation must be considered, so that separate images directed to each eye can be advantageously spaced and correctly separated for viewing. It is instructive to note that interocular distance constraints limit the ability to achieve larger pupil diameter at a given ultrawide field by simply scaling the projection lens.

Monocentric imaging systems have been shown to provide significant advantages for high-resolution imaging of flat objects, such as is disclosed in U.S. Pat. No. 3,748,015 (Offner), which teaches an arrangement of spherical mirrors arranged with coincident centers of curvature in an imaging system designed for unit magnification. The monocentric arrangement disclosed in the Offner patent minimizes a number of types of image aberration and is conceptually straightforward, allowing a simplified optical design for high-resolution catoptric imaging systems. A monocentric arrangement of mirrors and lenses is also known to provide advantages for telescopic systems having wide field of view, as is disclosed in U.S. Pat. No. 4,331,390 (Shafer). However, while the advantages of monocentric design for overall simplicity and for minimizing distortion and optical aberrations can be appreciated, such a design concept can be difficult to implement in an immersion system requiring wide field of view and large exit pupil with a reasonably small overall footprint. Moreover, a fully monocentric design would not meet the requirement for full stereoscopic imaging, requiring separate images for left and right pupils.

As is disclosed in U.S. Pat. No. 5,908,300, conventional wide-field projection lenses can be employed as projection lenses in a pupil-imaging autostereoscopic display. However, there are a number of disadvantages with conventional approaches. Wide-angle lens systems, capable of angular fields such as would be needed for effective immersion viewing, would be very complex and costly. Typical wide angle lenses for large-format cameras, such as the Biogon™ lens manufactured by Carl-Zeiss-Stiftung in Jena, Germany for example, are capable of 75-degree angular fields. The Biogon lens consists of seven component lenses and is more than 80 mm in diameter, while only providing a pupil size of 10 mm. For larger pupil size, the lens needs to be scaled in size; however, the large diameter of such a lens body presents a significant design difficulty for an autostereoscopic immersion system, relative to the interocular distance at the viewing position. Costly cutting of lenses so that right- and left-eye assemblies could be disposed side-by-side, thereby achieving a pair of lens pupils spaced consistently with human interocular separation, presents difficult manufacturing problems. Interocular distance limitations constrain the spatial positioning of projection apparatus for each eye and preclude scaling of pupil size by simple scaling of the lens. Moreover, an effective immersion system most advantageously allows a very wide field of view, preferably well in excess of 90 degrees, and would provide large exit pupil diameters, preferably larger than 20 mm.

As an alternative for large field of view applications, ball lenses have been employed for specialized optical functions, particularly miniaturized ball lenses for use in fiber optics coupling and transmission applications, such as is disclosed in U.S. Pat. No. 5,940,564 (Jewell) which discloses advantageous use of a miniature ball lens within a coupling device. On a larger scale, ball lenses can be utilized within an astronomical tracking device, as is disclosed in U.S. Pat. No. 5,206,499 (Mantravadi et al.) In the Mantravadi et al. patent, the ball lens is employed because it allows a wide field of view, greater than 60 degrees, with minimal off-axis aberrations or distortions. In particular, the absence of a unique optical axis is used advantageously, so that every principal ray that passes through the ball lens can be considered to define its own optical axis. Because of its low illumination falloff relative to angular changes of incident light, a single ball lens is favorably used to direct light from space to a plurality of sensors in this application. Notably, photosensors at the output of the ball lens are disposed along a curved focal plane.

The benefits of a spherical or ball lens for wide angle imaging are also utilized in an apparatus for determining space-craft attitude, as is disclosed in U.S. Pat. No. 5,319,968 (Billing-Ross et al.) Here, an array of mirrors direct light rays through a ball lens. The shape of this lens is advantageous since beams which pass through the lens are at normal incidence to the image surface. The light rays are thus refracted toward the center of the lens, resulting in an imaging system having a wide field of view.

Another specialized use of ball lens characteristics is disclosed in U.S. Pat. No. 4,854,688 (Hayford et al.) In the optical arrangement of the Hayford et al. patent, directed to the transmission of a CRT-generated 2-dimensional image along a non-linear path, such as attached to headgear for a pilot, a ball lens directs a collimated input image, optically at infinity, for a pilot's view.

Another use for wide-angle viewing capabilities of a ball lens is disclosed in U.S. Pat. No. 4,124,978 (Thompson), which teaches use of a ball lens as part of an objective lens in binocular optics for night viewing.

With U.S. Pat. Nos. 4,124,978 and 4,854,688 described above disclose use of a ball lens in image projection, there are suggestions of the overall capability of the ball lens to provide, in conjunction with support optics, wide field of view imaging. However, there are substantial problems that must be overcome in order to make effective use of such devices for immersive imaging applications, particularly where an image is electronically processed to be projected. For example, conventional electronic image presentation techniques, using devices such as spatial light modulators, provide an image on a flat surface. Ball lens performance with flat field imaging would be extremely poor.

There are also other basic optical limitations for immersion systems that must be addressed with any type of optical projection that provides a wide field of view. An important limitation is imposed by the LaGrange invariant. Any imaging system conforms to the LaGrange invariant, whereby the product of pupil size and semi-field angle is equal to the product of the image size and the numerical aperture and is an invariant for the optical system. This can be a limitation when using, as an image generator, a relatively small spatial light modulator or similar pixel array which can operate over a relatively small numerical aperture since the LaGrange value associated with the device is small. A monocentric imaging system, however, providing a large field of view with a large pupil size (that is, a large numerical aperture), inherently has a large LaGrange value. Thus, when this monocentric imaging system is used with a spatial light modulator having a small LaGrange value, either the field or the aperture of the imaging system, or both, will be underfilled due to such a mismatch of LaGrange values. For a detailed description of the LaGrange invariant, reference is made to *Modern Optical Engineering, The Design of Optical Systems* by Warren J. Smith, published by McGraw-Hill, Inc., pages 42–45.

Copending U.S. patent application Ser. Nos. 09/738,747 and 09/854,699 take advantage of capabilities for wide field of view projection using a ball lens in an autostereoscopic imaging system. In both of these copending applications, the source image that is provided to the projecting ball lens for each eye is presented as a complete two-dimensional image, presented on a surface. The image source disclosed in the preferred embodiment of each of these applications is a two-dimensional array, such as an LCD, a DMD, or similar device. The image source could alternately be a CRT which, even though generated by a scanned electron beam, presents a complete two-dimensional image to ball lens projection optics.

It can be appreciated by those skilled in the optical arts that a high brightness image source would be most advantageous for wide-field autostereoscopic imaging. However, in order to achieve suitable brightness levels for conventional autostereoscopic systems, LCD or DMD-based systems require complex and costly high-power illumination apparatus. CRT and OLED technologies, meanwhile, do not provide solutions that offer high brightness for wide-field autostereoscopic imaging. Thus, there is a recognized need for a simple, low cost, high-brightness image source that is well-suited to autostereoscopic imaging apparatus.

Resonant fiber optic scanning has been proposed for use in diagnostic instrumentation, such as in endoscopic equipment, for example. An article by Eric J Seibel, Quinn Y. J. Smithwick, Chris M. Brown, and Per G. Reinhall, entitled "Single fiber endoscope: general design for small size, high resolution, and wide field of view" in *Proceedings of SPIE*, Vol. 4158 (2001) pp. 29–39, describes the use of a vibrating, flexible optical fiber in 2-D scanning applications, where scanning is used for an input sensing function. When actuated at resonant frequency, a fiber optic element can be controllably scanned over an area to trace out a given regular pattern in a periodic fashion. Using this capability, U.S. Pat. No. 6,294,775 (Seibel et al.) discloses methods for controlled deflection of a flexible optical fiber as a scanning component in an image acquisition system.

While resonant fiber scanning is being employed for image acquisition functions, as noted in the above article and in U.S. Pat. No. 6,294,775, there are also advantages in using this technology for image formation, such as in image projection apparatus.

Thus it can be seen that, while there are some conventional approaches that meet some of the requirements for stereoscopic imaging, there is a need for an improved autostereoscopic imaging solution for viewing electronically generated images, where the solution provides a structurally simple apparatus, minimizes aberrations and image distortion, and meets demanding requirements for wide field of view, large pupil size, high brightness, and lowered cost.

SUMMARY OF THE INVENTION

It is an object of the present invention to provide a substantially monocentric autostereoscopic optical apparatus for displaying a stereoscopic virtual image comprising a left image to be viewed by an observer at a left viewing pupil and a right image to be viewed by the observer at a right viewing pupil, the apparatus comprising:

(a) a left image generation system and, similarly constructed, a right image generation system, wherein each left and right image generation system forms a first intermediate curved image comprising an array of image pixels, with each image generation system comprising:
  (a1) a light source for emitting modulated light as a series of image pixels arranged according to a scan pattern;
  (a2) an optical waveguide having an input end coupled to the light source and a flexible output end for deflection, the output end emitting the modulated light;
  (a3) an actuator for deflecting said flexible output end of the optical waveguide according to the scan pattern;
  (a4) a curved surface for forming the first intermediate curved image thereon by receiving the modulated light emitted from the output end of the optical waveguide as deflected by the actuator according to the scan pattern;
  (a5) an optical relay element for relaying, onto the curved surface, the modulated light emitted from the flexible output end of the optical waveguide according to the scan pattern, forming the first intermediate curved image thereby;
(b) a left ball lens assembly for projecting the first intermediate curved image from the left image generation system to form a second intermediate curved image from the left image generation system, the left ball lens assembly having a left ball lens pupil;
(c) a right ball lens assembly for projecting the first intermediate curved image from the right image generation system to form a second intermediate curved image from the right image generation system, the right ball lens assembly having a right ball lens pupil;
(d) a curved mirror disposed to form a real image of the left ball lens pupil at the left viewing pupil and to form a real image of the right ball lens pupil at the right viewing pupil; and
the curved mirror forming the virtual stereoscopic image from the second intermediate curved image from the left image generation system and from the second intermediate curved image from the right image generation system.

A feature of the present invention is the use of a monocentric arrangement of optical components, thus simplifying design, minimizing aberrations and providing a wide field of view with large exit pupils.

A further feature of the present invention is the use of a resonant fiber optic image source for providing a scanned intermediate image.

A further feature of the present invention is that it allows a number of configurations, including configurations that minimize the number of optical components required, even including configurations that eliminate the need for a beamsplitter.

It is an advantage of the present invention is that it eliminates the need for a higher cost two-dimensional surface as image source, replacing this with a lower cost scanned resonant fiber optic source.

It is a further advantage of the present invention that it allows use of inexpensive, bright light sources for generating an intermediate image for projection.

It is a further advantage of the present invention that it provides a compact arrangement of optical components, capable of being packaged in a display system having a small footprint.

It is a further advantage of the present invention that it allows high-resolution stereoscopic electronic imaging with high brightness and high contrast, with a very wide field of view. The present invention provides a system that is very light-efficient, capable of providing high brightness levels for projection.

It is a further advantage of the present invention that it provides a solution for wide field stereoscopic projection that is inexpensive when compared with the cost of conventional projection lens systems.

It is a further advantage of the present invention that it provides stereoscopic viewing without requiring an observer to wear goggles or other device.

It is yet a further advantage of the present invention that it provides an exit pupil of sufficient size for non-critical alignment of an observer in relation to the display.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figure 1:
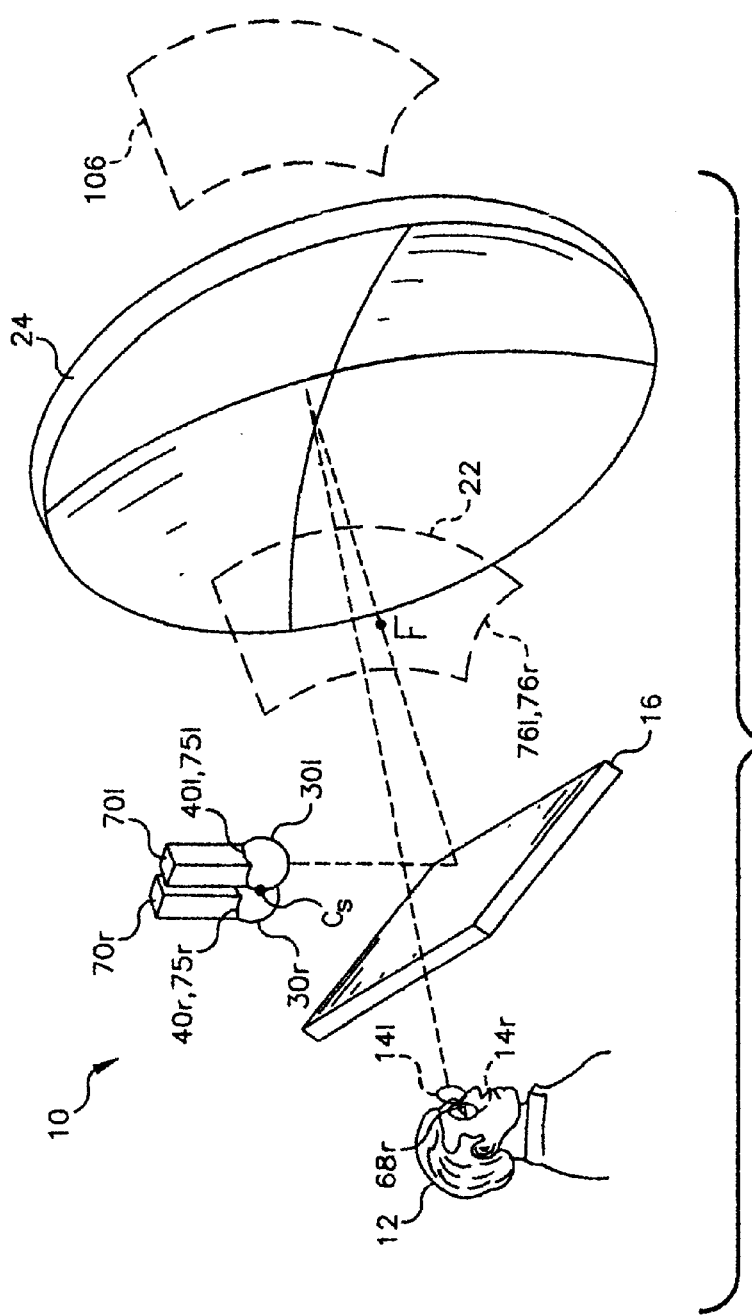
FIG. 1 is a perspective view showing key components of the apparatus of the present invention in an autostereoscopic imaging system.

Referring to FIG. 1, there is shown a perspective view of an autostereoscopic imaging system 10. An observer 12 is typically seated in position to view a virtual stereoscopic image from left and right viewing pupils 14*l* and 14*r*. Optimal viewing conditions are obtained when left and right eye pupils 68*l* (not visible in the view of FIG. 1) and 68*r* of observer 12 are coincident with the position of corresponding left and right viewing pupils 14*l* and 14*r*.

A left image generation system 70*l* and a right image generation system 70*r* operate jointly to provide a virtual image 106 for stereoscopic viewing. Both left and right image generation systems 70*l* and 70*r* operate and interact with other elements of autostereoscopic imaging system 10 similarly; for simplicity, the left optical path is described and is indicated in FIG. 1. Left image generation system 70*l* generates, on a left curved surface 40*l*, a first left intermediate curved image 75*l* for a left ball lens assembly 30*l*. Left ball lens assembly 30*l* projects first left intermediate curved image 75*l*, which is reflected from a beamsplitter 16 to form a second left intermediate curved image 76*l*, near a front focal surface 22 of a curved mirror 24. In similar fashion, a second right intermediate curved image 76*r* is generated by forming a first right intermediate curved image 75*r* on a right curved surface 40*r* which is projected by a right ball lens 30*r*. Curved mirror 24 cooperates with beamsplitter 16 to form, from second left intermediate curved image 76*l* and, similarly, from second right intermediate curved image 76*r*, virtual image 106 which is presented to observer 12 at left and right viewing pupils 14*l* and 14*r*. Virtual image 106 appears to observer 12 as if it were behind curved mirror 24, somewhere between the rear of curved mirror 24 and infinity.

The description that follows primarily focuses on the optical components that direct light to either one of viewing pupils 14*l* and 14*r*. It should be emphasized, as was just described above, that similar optical components are employed for left image generation system 70*l* and for right image generation system 70*r* and, overall, for both left and right optical paths. For clarity, the description that follows applies equally to components in both right and left optical paths. Any distinction between right and left optical paths is made only when it is necessary to be precise. (Appended left "l" or right "r" designators for part numbers are, for this reason, omitted from this description unless needed.)

It must be noted that, as shown in FIG. 1, there are two components to the stereoscopic image seen by observer 12. For simplicity, FIG. 1 indicates, with dashed lines, only the optical path for generating left viewing pupil 14*l*. The projection paths for left and right viewing pupils 14*l* and 14*r* cross in autostereoscopic imaging system 10, due to imaging by curved mirror 24. Front focal surface 22 is optically centered about center of curvature $C_s$ of curved mirror 24. Focal point F is a point on focal surface 22, at the intersection of the projection path.

FIG. 1 illustrates some of the key problems to be solved, from an optical design perspective, and shows an overview of the solution provided by the present invention. It is instructive to review key design considerations for achieving the most life-like stereoscopic viewing. In order to provide observer 12 with an effective immersion experience, a wide field of view is important, in excess of the 60 degrees available using prior art techniques. In order to be used comfortably by observer 12, viewing pupils 14*l* and 14*r* must be sufficiently large. As a design goal, autostereoscopic imaging system 10 of the present invention is intended to provide a field of view of at least 90 degrees with the diameter of viewing pupil 14 in excess of 20 mm diameter. To provide a viewable stereoscopic virtual image over a range of human interocular separations, ball lens assemblies 30*l* and 30*r* are advantageously separated by an appropriate, empirically determined interaxial distance.

Alternately, the interaxial distance between scanning ball lens assemblies 30*l* and 30*r* could be manually adjusted to suit interocular dimensions of observer 12 or could be automatically sensed and adjusted by autostereoscopic imaging system 10. Components of left and right image generation systems 70*l* and 70*r* and their corresponding left and right ball lens assemblies 30*l* and 30*r* could be mounted on a boom, for example, allowing movement of each image generation system 70*l*/70*r* relative to the other in order to compensate for interocular distance differences. Reference is made to commonly-assigned copending U.S. patent application Ser. No. 09/854,699, which describes automated sensing and adjustment of left- and right-eye projection assemblies using ball lenses. The same feedback loop apparatus and methods disclosed in this earlier application could also be applied for corresponding apparatus in the present invention.

Monocentric Design of Image Path

Figure 2:
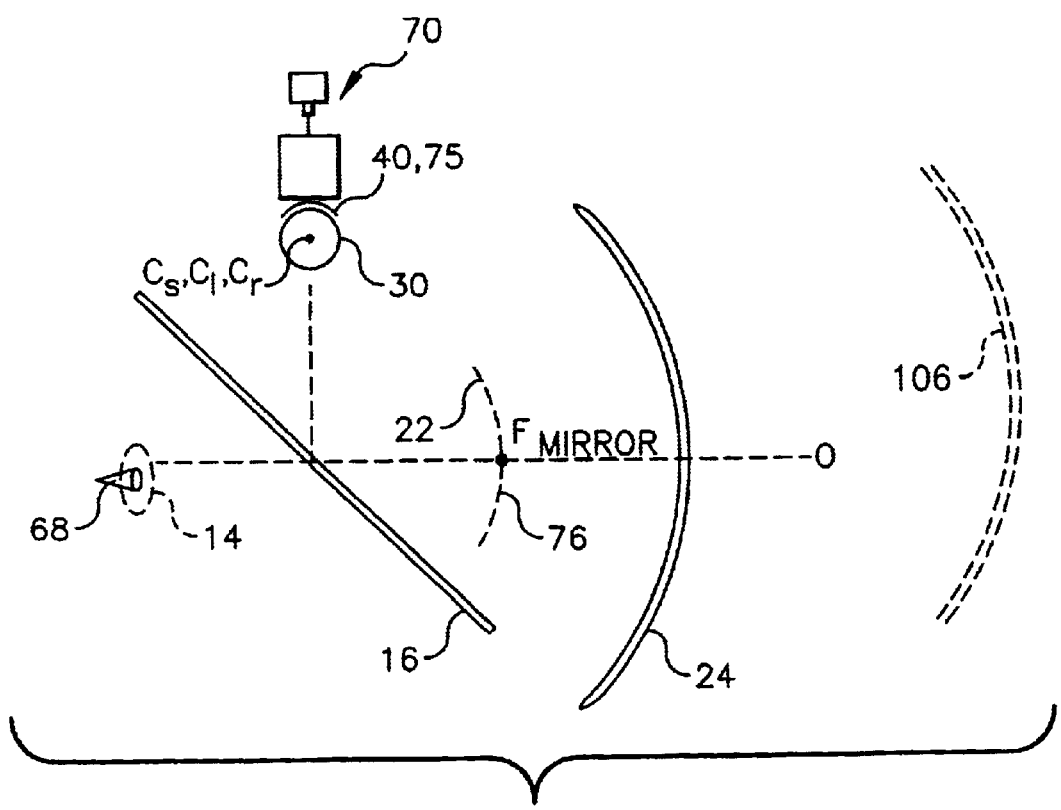
FIG. 2 is a side schematic view showing the substantially concentric relationship of projection optics in an optically unfolded view.

The substantially monocentric arrangement of optical components in the apparatus of the present invention provides a number of clear advantages for minimizing image aberrations and for maximizing field of view. Referring to FIG. 2, there is shown, from a side view, the optically concentric relationship of key components in the optical path, in folded form, applicable for both left and right image paths. The center of curvature of mirror 24 is $C_s$, optically located midway between left and right ball lens assemblies 30*l* and 30*r*. In the general scheme shown in FIG. 2, curved surface 40 is preferably curved so that its center of its radius of curvature is identical to center $C_l$ or $C_r$ of ball lens assembly 30. This concentric arrangement enables ball lens assembly 30, in cooperation with beamsplitter 16, to form second intermediate curved image 76, which, optically, shares the same center of curvature $C_l$ or $C_r$ as ball lens assembly 30. Focal point $F_{mirror}$ of curved mirror 24 lies at the intersection of focal surface 22 with optical axis O. Curved mirror 24 is preferably spherical, again sharing the same center of curvature as scanning ball lens assembly at center $C_l$ or $C_r$.

It is instructive to observe that FIG. 2 gives a generalized, first approximation of the relationship of components in the folded optical path. The actual position of the center of curvature of curved mirror 24, labeled $C_s$ in FIG. 2, is midway between the centers of curvature of left and right scanning ball lens assemblies 30*l* and 30*r*, labeled $C_l$ and $C_r$ respectively, but not separately visible from the side view in FIG. 2. Because there are separate left and right scanning ball lens assemblies 30*l* and 30*r*, and, correspondingly, an interocular distance between left and right human eye pupils 68*l* and 68*r* of observer 12, a geometrically perfect monocentricity of optical components cannot be achieved. As a close approximation, substantial monocentricity is effected relative to center $C_s$ in FIG. 2. It is also instructive to observe that the ideal placement of left and right scanning ball lens assemblies 30*l* and 30*r* for observer 12 would be such that their real images, formed by curved mirror 24, would correspond with the position and interocular separation of left and right viewing pupils 14*l* and 14*r*, respectively.

Referring back to FIG. 1 by way of reference, the optimal position of second intermediate image 76 is within a range that can be considered "near" focal surface 22. The preferred range extends from focal surface 22 itself as an outer limit to an inner limit that is within approximately 20% of the distance between focal surface 22 and the surface of curved mirror 24. If second intermediate image 76 were formed between focal surface 22 and observer 12, virtual image 106 would appear to be out of focus.

Because ball lens assembly 30 is spherical with center of curvature at center C, as the unfolded arrangement of FIG.

2 shows, a wide field of view can be provided, with minimal image aberration. It must be noted that the design of the present invention is optimized for unity pupil magnification; however, some variation from unity pupil magnification is possible, within the scope of the present invention.

Operation of Ball Lens Assembly 30

Figure 3:
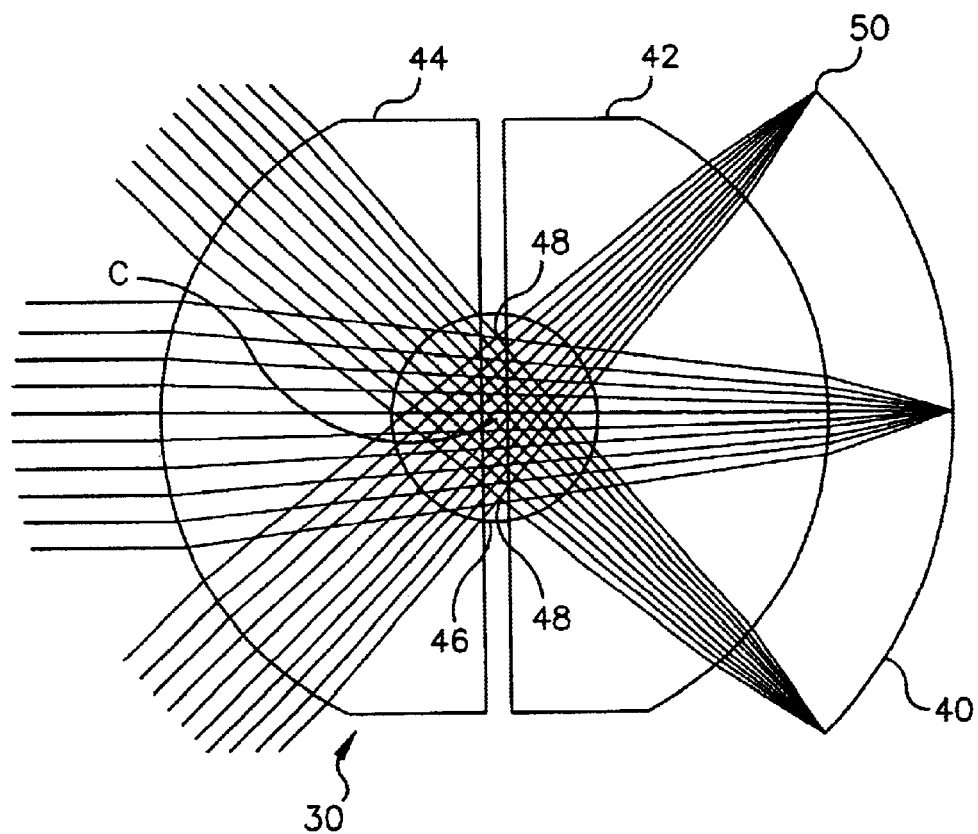
FIG. 3 is a cross-section view showing the composition of a ball lens assembly.

Ball lens assembly 30*l*/30*r* functions as the projection lens for its associated left or right optical system. Referring to FIG. 3, there is shown the concentric arrangement provided for each ball lens assembly 30. A central spherical lens 46 is disposed between meniscus lenses 42 and 44, wherein meniscus lenses 42 and 44 have indices of refraction and other characteristics intended to minimize on-axis spherical and chromatic aberration, as is well known in the optical design arts. Stops 48 limit the entrance pupil within ball lens assembly 30. Stops 48 need not be physical, but may alternately be implemented using optical effects such as total internal reflection. In terms of the optics path, stops 48 serve to define an exit pupil for ball lens assembly 30.

In a preferred embodiment, meniscus lenses 42 and 44 are selected to reduce image aberration and to optimize image quality for the image projected toward curved mirror 24. It must be noted that ball lens assembly 30 could comprise any number of arrangements of support lenses surrounding central spherical lens 46. Surfaces of these support lenses, however many are employed, would share a common center of curvature C with central spherical lens 46. Moreover, the refractive materials used for lens components of ball lens assembly 30 could be varied, within the scope of the present invention. For example, in addition to standard glass lenses, central spherical lens 46 could comprise a plastic, an oil or other liquid substance, or any other refractive material chosen for the requirements of the application. Meniscus lenses 42 and 44, and any other additional support lenses in ball lens assembly 30, could be made of glass, plastic, enclosed liquids, or other suitable refractive materials, all within the scope of the present invention. In its simplest embodiment, ball lens assembly 30 could comprise a single central spherical lens 46, without additional supporting refractive components.

Image Generation System 70

Figure 4:
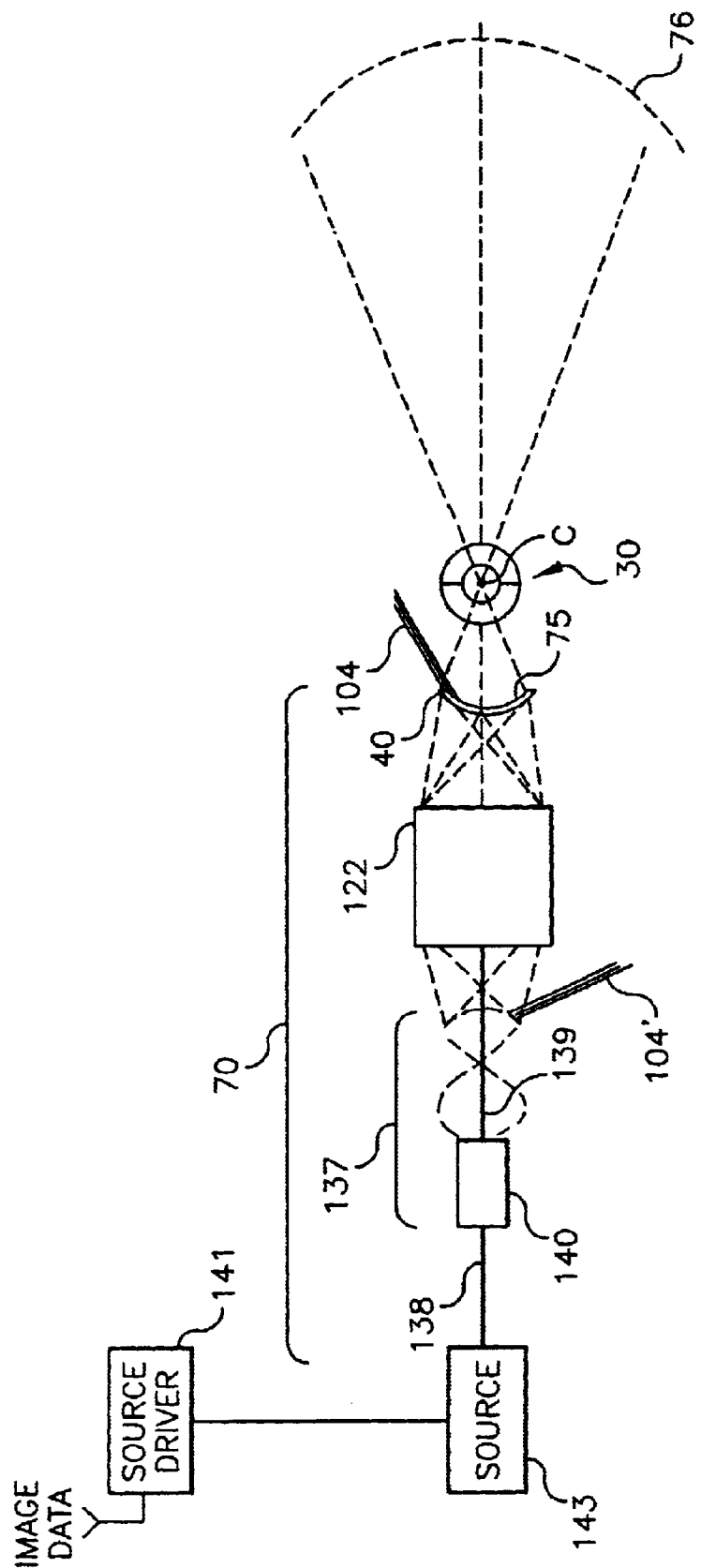
FIG. 4 is a schematic view showing image generation system components of the present invention.

Referring to FIG. 4, there is shown in more detail the arrangement of components of image generation system 70. Image data from a digital image source is input to a light source driver 141, which contains the logic control and drive electronics for modulating a light source 143. Light source 143 provides the modulated light signal used to form first intermediate curved image 75. Light source 143 is coupled to an optical fiber 138, which serves as an optical waveguide. Techniques for coupling light sources to optical fibers, well known in the optical arts, include butt-coupling and lens coupling, for example. In the preferred embodiment, light source 143 is a laser that can be directly modulated.

Light source 143 and optical fiber 138 cooperate with a resonant fiber scanner 137 and a relay lens assembly 122 to form first intermediate curved image 75. First intermediate curved image 75, comprising individual pixels 104, is formed on curved surface 40 for projection by ball lens assembly 30.

Resonant fiber scanner 137 comprises an end-portion of optical fiber 138 that acts as a resonant cantilever portion 139 and an actuator 140 that drives resonant cantilever portion 139 movement. Actuator 140 is itself controlled by drive signals that are synchronized with light source driver 141, which provides control signals to light source 143.

Relay lens assembly 122 acts as an optical relay element, forming each image pixel 104 in first intermediate curved image 75 from a corresponding scanner pixel 104' generated by the interaction of light source 143 and resonant fiber scanner 137. As part of this function, relay lens assembly 122 must provide the required field curvature to first intermediate curved image 75 on curved surface 40. As is shown in schematic view of FIG. 4, relay lens assembly 122 may be required to relay an image from one curvature, formed by the action of resonant cantilever portion 139, to a second curvature, formed by curved surface 40. Thus, relay lens assembly 122 may comprise any number of lenses suitably configured for this purpose. As another alternative, relay lens assembly 122 may comprise a fiber optic faceplate, such as those manufactured by Incom, Inc., Charlton, Mass. for example, or fiber optic billet, close-coupled with the output end of resonant cantilever portion 139.

As is shown in FIG. 4, the output end of resonant cantilever portion 139 emits a single scanner pixel 104' at a time, acting as a point source that is modulated in a time-sequenced manner, to provide each image pixel 104 in a two-dimensional image array of image pixels 104. Resonant fiber scanner 137 operates as is disclosed in the article entitled "Single fiber endoscope: general design for small size, high resolution, and wide field of view" by Eric J. Seibel, Quinn Y. J. Smithwick, Chris M. Brown, and G. Reinhall, in *Proceedings of SPIE*, Vol. 4158 (2001) pp. 29–39, cited above.

Actuator 140 could be any of a number of types of actuator adapted to provide the necessary resonant vibration to resonant cantilever portion 139. Examples of suitable types of actuator 140 include piezoelectric bimorph or piezoelectric tube actuators; such as piezoceramic tubes available from ValpeyFisher Corporation, located in Hopkinton, Mass. Other suitable actuators could be electromagnetic actuators including electrodynamic devices such as a voice coil, resonant scanners, Micro-Electro-Mechanical Structures (MEMS) actuators, galvanometers, electrostatic actuators; and mechanical actuators, such as one or more motors combined with eccentric cams, for example.

The scan pattern that actuator 140 imparts to the output end of resonant cantilever portion 139 can trace out the complete two-dimensional array of image pixels 104 in a number of ways. The most straightforward scan pattern would be the rectilinear scan pattern, such as the pattern conventionally employed for CRT electron beam scanning. However, other patterns are possible. For example, since the goal of image generation system 70 is to provide a curved image, there may be advantages in a scan pattern that is spiral in shape or that comprises concentric circles. Other scans, such as the propeller scan noted in the article cited above, might be advantages for some imaging conditions. It must be observed that the scan pattern used determines the sequencing of scanner pixels 104'.

In the preferred embodiment, curved surface 40 is a diffusive, curved surface having a center of curvature coincident with center of curvature C of ball lens assembly 30. As is shown again in FIG. 4, ball lens assembly 30 projects first intermediate curved image 75 to form second intermediate curved image 76.

The concentric arrangement with curved surface 40 and ball lens assembly 30 minimizes field aberrations and on-axis aberration for projection of the first left/right intermediate curved image 75*l*/75*r* formed on curved surface 40. Referring back to FIG. 3, curved surface 40 can thus be considered as a myriad set of dispersive point sources 50, whose rays are received by ball lens assembly 30. By providing first intermediate curved image 75 on curved diffusive surface 40, LaGrange invariant constraints on exit pupil size and field angle are effectively overcome. In terms of components shown in FIG. 1, curved surface 40 acts as an interface to match the low LaGrange invariant that is characteristic of image generation system 70 with the higher LaGrange invariant of stereoscopic projection components, including ball lens assembly 30, beamsplitter 16, and curved mirror 24. By overcoming LaGrange invariant constraints, the use of curved surface 40 thus allows wide angle projection of the image by ball lens assembly 30.

The function of curved surface 40 is to diffuse the light relayed from relay lens assembly 122, but with as much brightness as possible, for projection at a wide image angle by ball lens assembly 30. To allow eventual viewing of the projected image by observer 12, it is important that each point source 50 effectively fill stop 48 of ball lens assembly 30. If this is achieved, observer 12, with eyes positioned at viewing pupils 14l/14r, can view the entire projected image from any point within viewing pupils 14l/14r.

In the preferred embodiment, curved surface 40 comprises a coating applied to a surface, such as applied to a lens. Suitable diffusive coatings and treatments for curved surface 40 are known to those skilled in the optical arts. Alternately, curved surface 40 could be ground, etched, or treated in some other way in order to provide the needed diffusive characteristics, as is well known in the optical arts.

In an alternate embodiment, diffusive curved surface 40 could be implemented using a fiber optic faceplate, such as those manufactured by Incom, Inc., Charlton, Mass. Typically used in flat panel display applications, fiber optic faceplates transfer an image from one surface to another. As part of curved surface 40, a fiber optic faceplate could have, for example, a double-concave shape for transferring the image relayed by relay lens assembly 122 from an arbitrary field curvature to a field curvature that is concentric with ball lens assembly 30. The output concave surface of such a fiber optic faceplate would act as curved surface 40 and could be treated using a number of techniques familiar to those skilled in the optical arts for enhancing the performance of a diffusive surface. Surface treatments could be achieved, for example, using various grinding, buffing, etching, or other techniques that result in a diffusive surface, or using a holographic grating, for example. A diffusive coating could alternately be applied to the output concave portion of curved surface 40.

It is instructive to note that the apparatus and method of the present invention allow the aspect ratio or corresponding dimensional measurement of first intermediate curved image 75 to be variable within a range by manipulating the scanning pattern of resonant fiber scanner 137 or by controlling the data timing for the imaging beam, or using some combination of scanning pattern and timing adjustment.

Options for Curved Mirror 24 Arrangement

Figure 5:
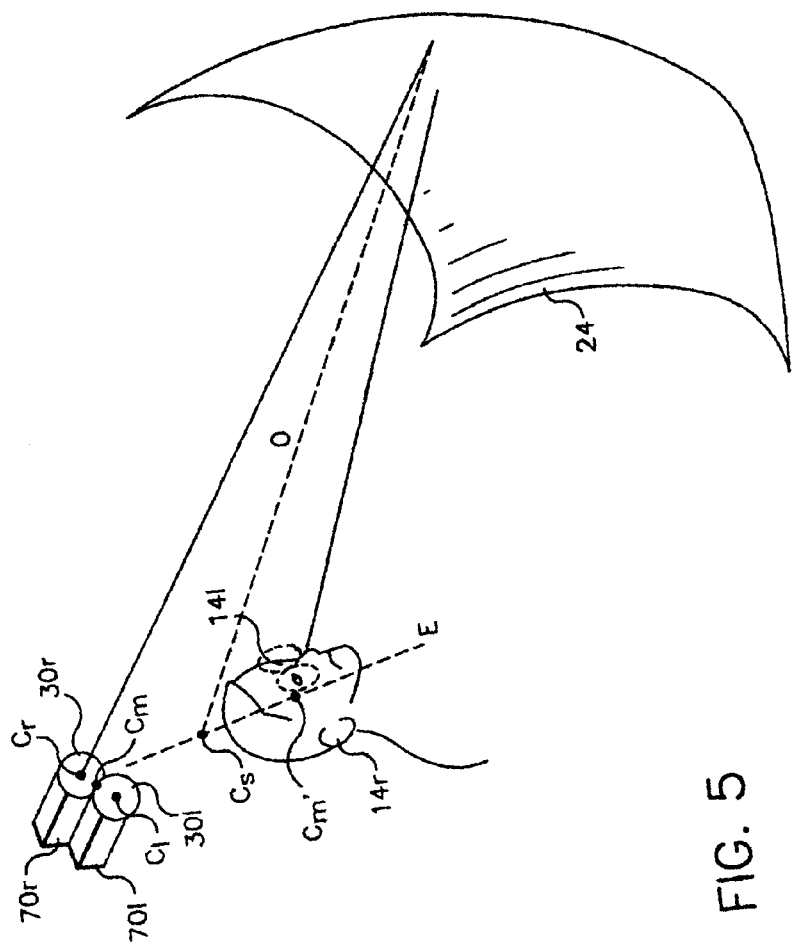
FIG. 5 is a perspective view showing key components of the apparatus of the present invention for an alternate embodiment autostereoscopic imaging system using a curved mirror and essentially paraxial optics.
Figure 6:
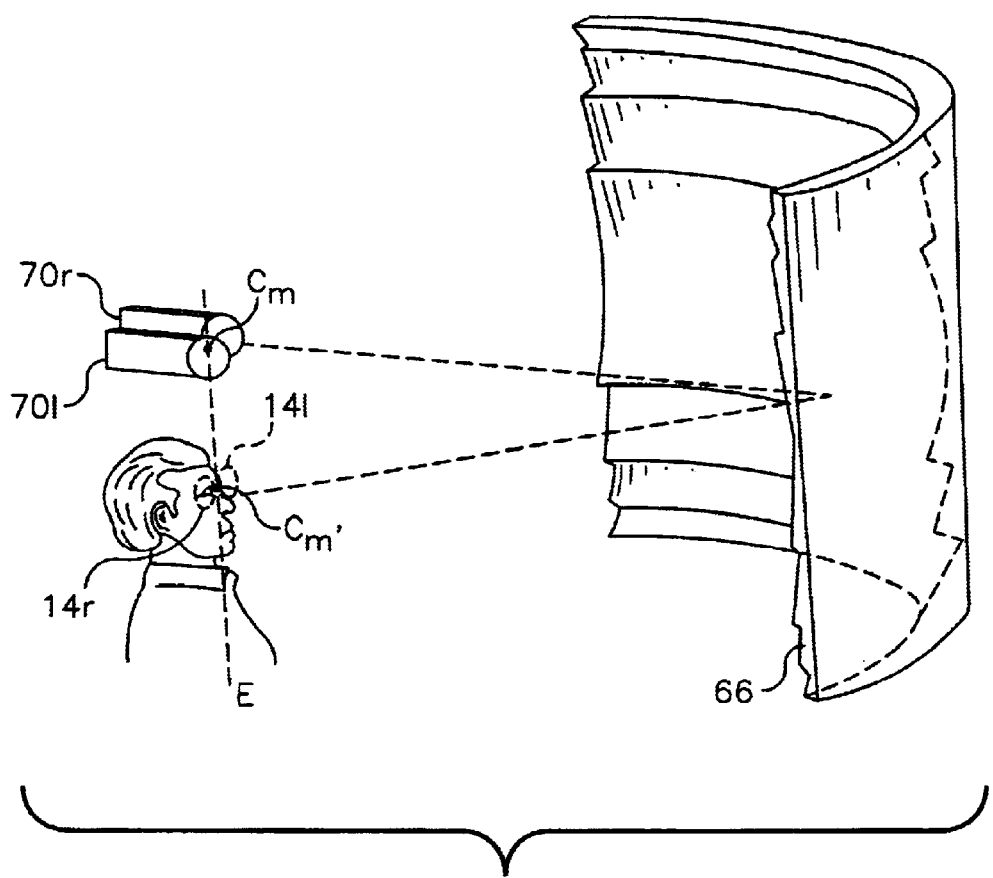
FIG. 6 is a perspective view showing key components of the apparatus of the present invention for another alternate embodiment autostereoscopic imaging system using a curved Fresnel mirror and essentially paraxial optics; and, FIG. 7 is a schematic view showing an embodiment of the image generation system of the present invention for color imaging.

In the most general terms, curved mirror 24 is a reflective surface of some type, acting as a reflective means for forming the autostereoscopic image. The preferred embodiment, described above with reference to FIGS. 1 and 2, employs an essentially spherical mirror as curved mirror 24, having a center of curvature substantially optically midway between left and right ball lens assemblies 30l and 30r. With this spherical arrangement, curved mirror 24 forms a real image of left and right ball lens assemblies 30l and 30r at or very near corresponding left and right viewing pupils 14l and 14r. Other arrangements of curved mirror 24, however, can alternately be used, provided that these arrangements also provide a real image of left and right ball lens assemblies 30l and 30r at or near left and right viewing pupil 14l and 14r positions. The configurations of FIGS. 5 and 6 show alternative arrangements that meet this imaging requirement for curved mirror 24.

It can be appreciated that if a shorter focal length for curved mirror 24 were provided, system dimensions could be scaled to a reduced size. This size reduction benefit makes it advantageous to adjust the actual shape of curved mirror 24 away from a precise spherical shape, to some degree. An aspheric shape could be used for curved mirror 24, to minimize off-axis pupil aberration, for example.

Curved mirror 24 can be a fairly expensive component to fabricate using traditional forming, grinding, and polishing techniques. It may be more practical to fabricate mirror 24 from two or more smaller mirror segments, joined together to assemble one large mirror 24.

As yet another alternative embodiment, curved mirror 24 may comprise a membrane mirror, such as a stretchable membrane mirror (SMM), whose curvature is determined by a controlled vacuum generated in an airtight cavity behind a stretched, reflective surface. Use of a stretchable membrane mirror is disclosed in the McKay article, referenced in the background section above.

Curved mirror 24 can alternately be embodied a replicated mirror, such as the replicated mirrors manufactured by Composite Mirror Applications, Inc., Tuscon, Ariz., for example. Single, curved replicated mirrors fabricated using composite replicated mirror technology offer particular advantages for cost, weight, and durability. Other possible alternatives for curved mirror 24 include Fresnel mirrors, or retroreflective mirrors or surfaces.

Referring to FIG. 5, there is shown an alternate, substantially monocentric arrangement in which left and right scanning ball lens assemblies 30l and 30r, disposed near optical axis O, project directly into curved mirror 24, without the use of beamsplitter 16, as was shown in FIGS. 1 and 2. For such an arrangement, curved mirror 24 must have acceptable off-axis performance, since the image path for each viewing pupil 14l and 14r must be more than slightly off-center relative to the center of curvature $C_s$ of curved mirror 24. Aspheric mirrors could be employed for such an arrangement. In order for the arrangement of FIG. 5 to be feasible, the ratio of off-axis distance ($C_s$ to $C_m$ in FIG. 5) to the focal length of spherical curved mirror 24 must be small. As a rule-of-thumb, it has been determined that curved mirror 24 with a spherical surface can perform satisfactorily provided that the off-axis angle of left and right scanning ball lens assemblies 30l and 30r is within approximately 6 degrees.

For off-axis angles in excess of six degrees, an aspherical surface for curved mirror 24 is more suitable. For such an aspherical surface, a first center of curvature point $C_m'$ is located midway between viewing pupils 14l and 14r. A second center of curvature point $C_m$ is located midway between respective center points $C_l$ and $C_r$ of scanning ball lens assemblies 30l and 30r. Such an aspherical design could be toroidal and would be monocentric with respect to an axis E passing through points $C_m$ and $C_m'$. In cross-section, curved mirror 24 fabricated in this manner would be elliptical, with points $C_m$ and $C_m'$ serving as foci of the ellipse.

Referring to FIG. 6, there is shown yet another alternate arrangement, also without beamsplitter 16, similar to that shown in FIG. 5. In FIG. 6, curved mirror 24 is a cylindrically curved, reflective Fresnel mirror 66. The arrangement of components shown in FIG. 6 is again monocentric with respect to axis E, as was shown in FIG. 5. Reflective Fresnel mirror 66 has power in only one direction. Reflective Fresnel mirror 66 can be, for example, a planar element fabricated on a flexible substrate, similar to Fresnel optical components manufactured by Fresnel Optics, Rochester, N.Y. Fresnel mirror 66 could be curved into a generally cylindrical shape about axis E, as is shown in FIG. 6. Optionally, Fresnel mirror 66 could be essentially flat. Fresnel mirror 66 would image the exit pupils of scanning ball lens assemblies 30l/30r onto viewing pupils 14l/14r in a similar manner to that described above for curved mirror 24.

As yet another option using the overall component arrangement of FIG. 5, curved mirror 24 could be replaced using a retroreflective surface, such a surface having an essentially spherical shape with center of curvature coincident with that of scanning ball lens assembly 30. A retroreflective surface would not introduce the image-crossing effect caused by curved mirror reflection, traced out for the left image path in FIG. 1. Imaging using a retroreflective surface would provide advantages of an enlarged size for viewing pupil 14 and more uniform brightness. Use of a retroreflective surface could also eliminate the need for diffusive curved surface 40 in image generation system 70. It must be noted, however, that this alternate arrangement would provide a real image, not the virtual image formed by autostereoscopic imaging system 10 in the preferred embodiment.

The embodiments disclosed with reference to FIGS. 1 through 6 shows how images are formed, with different possible arrangements of components. It must be emphasized that there are a number of possible alternative embodiments within the scope of the present invention. There are, for example, a number of ways in which to provide color image sequencing using the apparatus and methods of the present invention. The scanning fiber technique disclosed allows color frames to be provided using interleaved color light beams or using time-sequenced color frames, for example.

Figure 7:
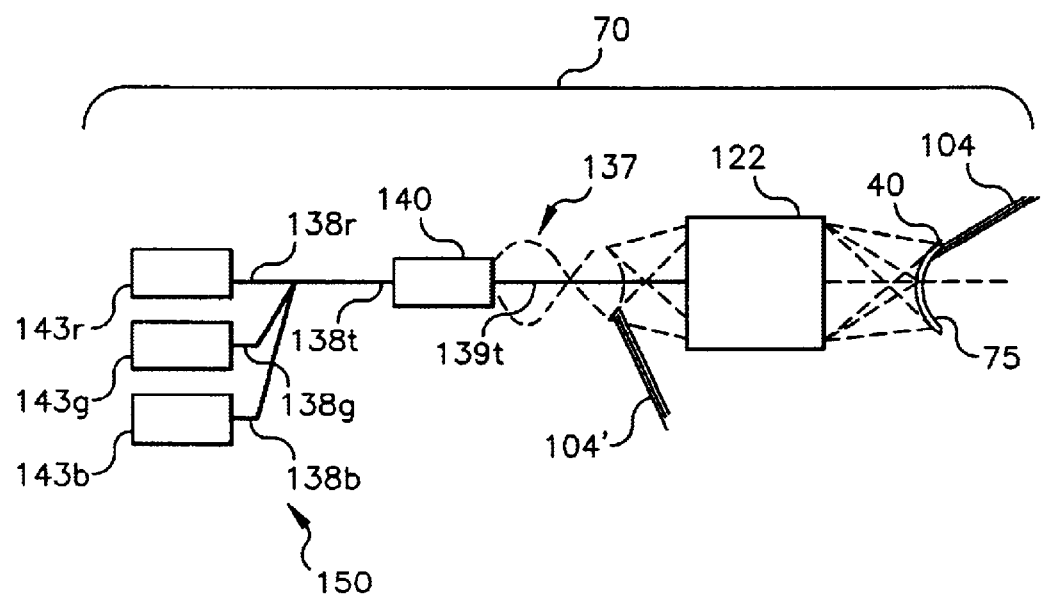

Referring to FIG. 7, there is shown a preferred embodiment of image generation system 70 for projection of color images. Red, green, and blue light sources 143r, 143g, and 143b are coupled to a trifurcated fiber assembly 150 which combines the corresponding individual colors from optical fiber, red 138r, optical fiber, green 138g, and optical fiber, blue 138b to provide a multicolor optical fiber 138t. Resonant fiber scanner 137 operates to actuate multicolor resonant cantilever portion 139t in order to form first intermediate curved image 75 as a color image. Red, green, and blue colors are conventionally used for full-color representation; however, alternate sets of two or more colors could be used for forming a multicolor image.

The preferred embodiment of the present invention provides an exceptionally wide field of view and the required brightness for stereoscoping imaging in excess of the 90-degree range, with viewing pupil 14 size near 20 mm. Moreover, ball lens assembly 30 provides excellent off-axis performance and allows a wider field of view, possibly up to 180 degrees. This provides an enhanced viewing experience for observer 12, without requiring that headset, goggles, or other device be worn.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, there are many possible arrangements for supporting projection optics, for color multiplexing and sequencing, and for reflective surfaces that could be used with the substantially monocentric arrangement of components disclosed for this invention.

Thus, what is provided is an apparatus and method for generating left- and right-eye images using a resonant fiber-optic member to form an image, with a monocentric arrangement of optical components to provide a very wide field of view and large exit pupils.

Parts List

10. Autostereoscopic imaging system
12. Observer
14. Viewing pupil
14l. Left viewing pupil
14r. Right viewing pupil
16. Beamsplitter
22. Front focal surface
24. Curved mirror
30. Ball lens assembly
30l. Left ball lens assembly
30r. Right ball lens assembly
40. Curved surface
40l. Left curved surface
40r. Right curved surface
42. Meniscus lens
44. Meniscus lens
46. Spherical lens
48. Stop
50. Dispersive point source
66. Fresnel mirror
68. Human eye pupil
68l. Left human eye pupil
68r. Right human eye pupil
70. Image generation system
70l. Left image generation system
70r. Right image generation system
75. First intermediate curved image
75l. First left intermediate curved image
75r. First right intermediate curved image
76. Second intermediate curved image
76l. Second left intermediate curved image
76r. Second right intermediate curved image
104. Image pixel
104'. Scanner pixel
106. Virtual image
122. Relay lens assembly
137. Resonant fiber scanner
138. Optical fiber
138r. Red optical fiber
138g. Green optical fiber
138b. Blue optical fiber
138t. Multicolor optical fiber
139. Resonant cantilever portion
139t. Multicolor resonant cantilever portion
140. Actuator
141. Light source driver
143. Light source
143r. Red light source
143g. Green light source
143b. Blue light source
150. Trifurcated fiber assembly

What is claimed is:

1. A substantially monocentric autostereoscopic optical apparatus for displaying a stereoscopic virtual image comprising a left image to be viewed by an observer at a left viewing pupil and a right image to be viewed by the observer at a right viewing pupil, the apparatus comprising:

(a) a left image generation system and a right image generation system, wherein each left and right image generation system forms a first intermediate curved image comprising an array of image pixels, wherein each image generation system comprises:
- (a1) a light source for emitting modulated light as a series of image pixels arranged according to a scan pattern;
- (a2) an optical waveguide having an input end coupled to said light source and a flexible output end wherein said output end emits said modulated light;
- (a3) an actuator for deflecting said flexible output end of said optical waveguide according to said scan pattern;
- (a4) a curved surface for forming said first intermediate curved image thereon by receiving said modulated light emitted from said output end of said optical waveguide as deflected by said actuator according to said scan pattern;
- (a5) an optical relay element for relaying, onto said curved surface, said modulated light emitted from said flexible output end of said optical waveguide according to said scan pattern, forming said first intermediate curved image thereby;
- (b) a left ball lens assembly for projecting said first intermediate curved image from said left image generation system to form a second intermediate curved image from said left image generation system, said left ball lens assembly having a left ball lens pupil;
- (c) a right ball lens assembly for projecting said first intermediate curved image from said right image generation system to form a second intermediate curved image from said right image generation system, said right ball lens assembly having a right ball lens pupil;
- (d) a curved mirror disposed to form a real image of said left ball lens pupil at said left viewing pupil and to form a real image of said right ball lens pupil at said right viewing pupil; and wherein said curved mirror forms said stereoscopic virtual image from said second intermediate curved image from said left image generation system and from said second intermediate curved image from said right image generation system.

2. The autostereoscopic optical apparatus of claim 1 wherein said light source is a laser.

3. The autostereoscopic optical apparatus of claim 1 wherein said light source provides white light.

4. The autostereoscopic optical apparatus of claim 1 wherein said scan pattern is rectilinear.

5. The autostereoscopic optical apparatus of claim 1 wherein said scan pattern is spiral.

6. The autostereoscopic optical apparatus of claim 1 wherein said scan pattern is radial.

7. The autostereoscopic optical apparatus of claim 1 wherein said scan pattern comprises concentric circles.

8. The autostereoscopic optical apparatus of claim 1 wherein said optical waveguide comprises an optical fiber.

9. The autostereoscopic optical apparatus of claim 1 wherein said actuator is piezoelectric.

10. The autostereoscopic optical apparatus of claim 1 wherein said actuator is electromagnetic.

11. The autostereoscopic optical apparatus of claim 1 wherein said actuator is electrodynamic.

12. The autostereoscopic optical apparatus of claim 1 wherein said actuator comprises a motor.

13. The autostereoscopic optical apparatus of claim 1 wherein said curved surface comprises a coating.

14. The autostereoscopic optical apparatus of claim 1 wherein said curved surface is ground to provide diffusive characteristics.

15. The autostereoscopic optical apparatus of claim 1 wherein said curved surface is etched to provide diffusive characteristics.

16. The autostereoscopic optical apparatus of claim 1 wherein said optical relay element comprises a fiber optic faceplate.

17. The autostereoscopic optical apparatus of claim 1 wherein, for said left image generation system, said ball lens assembly and said curved surface share, optically, the same center of curvature.

18. The autostereoscopic optical apparatus of claim 1 wherein, for said right image generation system, said ball lens assembly and said curved surface share, optically, the same center of curvature.

19. The autostereoscopic optical apparatus of claim 1 wherein said left ball lens assembly further comprises at least one meniscus lens.

20. The autostereoscopic optical apparatus of claim 1 wherein said right ball lens assembly further comprises at least one meniscus lens.

21. The autostereoscopic optical apparatus of claim 1 wherein said left ball lens assembly comprises a refractive liquid.

22. The autostereoscopic optical apparatus of claim 1 wherein said right ball lens assembly comprises a refractive liquid.

23. The autostereoscopic optical apparatus of claim 1 wherein said left ball lens assembly comprises a plastic lens element.

24. The autostereoscopic optical apparatus of claim 1 wherein said right ball lens assembly comprises a plastic lens element.

25. The autostereoscopic optical apparatus of claim 1 wherein said curved mirror comprises a plurality of mirror segments.

26. The autostereoscopic optical apparatus of claim 1 wherein said curved mirror comprises a replicated mirror.

27. The autostereoscopic optical apparatus of claim 1 wherein said curved mirror is essentially spherical.

28. The autostereoscopic optical apparatus of claim 1 wherein said curved mirror comprises a stretched membrane.

29. The autostereoscopic optical apparatus of claim 1 wherein said curved mirror comprises a Fresnel mirror.

30. The autostereoscopic optical apparatus of claim 1 wherein said curved mirror is toroidal.

31. The autostereoscopic optical apparatus of claim 1 wherein said curved mirror is aspheric.

32. The autostereoscopic optical apparatus of claim 1 further comprising a beamsplitter disposed to fold the optical path from said left ball lens assembly in order to form said second intermediate curved image from said left image generation system near a front focal surface of said curved mirror and to fold the optical path from said right ball lens assembly in order to form said second intermediate curved image from said right image generation system near said front focal surface of said curved mirror in order to form said stereoscopic virtual image thereby.

33. A substantially monocentric autostereoscopic optical apparatus for displaying a stereoscopic virtual image comprising a left image to be viewed by an observer at a left viewing pupil and a right image to be viewed by the observer at a right viewing pupil, the apparatus comprising:
- (a) a left image generation system and a right image generation system, wherein each left and right image generation system forms a first intermediate curved image comprising an array of image pixels, wherein each image generation system comprises:

(a1) a light source for emitting modulated light as a series of image pixels arranged according to a scan pattern;

(a2) an optical waveguide having an input end coupled to said light source and a flexible output end wherein said output end emits said modulated light;

(a3) an actuator for deflecting said flexible output end of said optical waveguide according to said scan pattern;

(a4) a curved surface for forming said first intermediate curved image thereon by receiving said modulated light emitted from said output end of said optical waveguide as deflected by said actuator according to said scan pattern;

(a5) an optical relay element for relaying, onto said curved surface, said modulated light emitted from said flexible output end of said optical waveguide according to said scan pattern, forming said first intermediate curved image thereby;

(b) a left ball lens assembly for projecting said first intermediate curved image from said left image generation system, said left ball lens assembly having a left ball lens pupil;

(c) a right ball lens assembly for projecting said first intermediate curved image from said right image generation system, said right ball lens assembly having a right ball lens pupil;

(d) a curved mirror and a beamsplitter, said beamsplitter disposed to fold the optical path from said left ball lens assembly to form, near a front focal surface of said curved mirror, a second intermediate curved image from said left image generation system, and to fold the optical path from said right ball lens assembly to form, near said front focal surface of said curved mirror, a second intermediate curved image from said right image generation system; and wherein said curved mirror, through said beamsplitter, forms a real image of said left ball lens pupil at said left viewing pupil and forming a real image of said right ball lens pupil at said right viewing pupil, said curved mirror forming said stereoscopic virtual image of said second intermediate curved image from said left image generation system and said second intermediate curved image from said right image generation system.

34. The autostereoscopic optical apparatus of claim 33 wherein said light source is a laser.

35. The autostereoscopic optical apparatus of claim 33 wherein said light source provides white light.

36. The autostereoscopic optical apparatus of claim 33 wherein said scan pattern is rectilinear.

37. The autostereoscopic optical apparatus of claim 33 wherein said scan pattern is spiral.

38. The autostereoscopic optical apparatus of claim 33 wherein said scan pattern is radial.

39. The autostereoscopic optical apparatus of claim 33 wherein said scan pattern comprises concentric circles.

40. The autostereoscopic optical apparatus of claim 33 wherein said optical waveguide comprises an optical fiber.

41. The autostereoscopic optical apparatus of claim 33 wherein said actuator is piezoelectric.

42. The autostereoscopic optical apparatus of claim 33 wherein said actuator is electromagnetic.

43. The autostereoscopic optical apparatus of claim 33 wherein said actuator is electrodynamic.

44. The autostereoscopic optical apparatus of claim 33 wherein said actuator comprises a motor.

45. The autostereoscopic optical apparatus of claim 33 wherein said curved surface comprises a coating.

46. The autostereoscopic optical apparatus of claim 33 wherein said curved surface is ground to provide diffusive characteristics.

47. The autostereoscopic optical apparatus of claim 33 wherein said curved surface is etched to provide diffusive characteristics.

48. The autostereoscopic optical apparatus of claim 33 wherein said optical relay element comprises a fiber optic faceplate.

49. The autostereoscopic optical apparatus of claim 33 wherein, for said left image generation system, said ball lens assembly and said curved surface share, optically, the same center of curvature.

50. The autostereoscopic optical apparatus of claim 33 wherein, for said right image generation system, said ball lens assembly and said curved surface share, optically, the same center of curvature.

51. The autostereoscopic optical apparatus of claim 33 wherein said left ball lens assembly further comprises at least one meniscus lens.

52. The autostereoscopic optical apparatus of claim 33 wherein said right ball lens assembly further comprises at least one meniscus lens.

53. The autostereoscopic optical apparatus of claim 33 wherein said left ball lens assembly comprises a refractive liquid.

54. The autostereoscopic optical apparatus of claim 33 wherein said right ball lens assembly comprises a refractive liquid.

55. The autostereoscopic optical apparatus of claim 33 wherein said left ball lens assembly comprises a plastic lens element.

56. The autostereoscopic optical apparatus of claim 33 wherein said right ball lens assembly comprises a plastic lens element.

57. The autostereoscopic optical apparatus of claim 33 wherein said curved mirror comprises a plurality of mirror segments.

58. The autostereoscopic optical apparatus of claim 33 wherein said curved mirror comprises a replicated mirror.

59. The autostereoscopic optical apparatus of claim 33 wherein said curved mirror is essentially spherical.

60. The autostereoscopic optical apparatus of claim 33 wherein said curved mirror comprises a stretched membrane.

61. The autostereoscopic optical apparatus of claim 33 wherein said curved mirror is aspheric.

62. A substantially monocentric autostereoscopic optical apparatus for displaying a stereoscopic virtual image comprising a left image to be viewed by an observer at a left viewing pupil and a right image to be viewed by the observer at a right viewing pupil, the apparatus comprising:

(a) a left image generation system and, similarly constructed, a right image generation system, wherein each left and right image generation system forms a first intermediate curved image comprising an array of image pixels, with each image generation system comprising:

(a1) a light source for emitting modulated light as a series of image pixels arranged according to a scan pattern;

(a2) an optical waveguide having an input end coupled to said light source and a flexible output end for deflection, said output end emitting said modulated light;

(a3) an actuator for deflecting said flexible output end of said optical waveguide according to said scan pattern;

(a4) a curved surface for forming said first intermediate curved image thereon by receiving said modulated light emitted from said output end of said optical waveguide as deflected by said actuator according to said scan pattern;

(a5) an optical relay element for relaying, onto said curved surface, said modulated light emitted from said flexible output end of said optical waveguide according to said scan pattern, forming said first intermediate curved image thereby;

(b) a left ball lens assembly for projecting said first intermediate curved image from said left image generation system to form a second intermediate curved image from said left image generation system, said left ball lens assembly having a left ball lens pupil;

(c) a right ball lens assembly for projecting said first intermediate curved image from said right image generation system to form a second intermediate curved image from said right image generation system, said right ball lens assembly having a right ball lens pupil; and (d) reflective means for forming a real image of said left ball lens pupil at said left viewing pupil and forming a real image of said right ball lens pupil at said right viewing pupil, said reflective means thereby forming said stereoscopic virtual image of said second intermediate curved image from said left image generation system and said second intermediate curved image from said right image generation system.

63. The autostereoscopic optical apparatus of claim 62 wherein said light source is a laser.

64. The autostereoscopic optical apparatus of claim 62 wherein said light source provides white light.

65. The autostereoscopic optical apparatus of claim 62 wherein said scan pattern is rectilinear.

66. The autostereoscopic optical apparatus of claim 62 wherein said scan pattern is spiral.

67. The autostereoscopic optical apparatus of claim 62 wherein said scan pattern is radial.

68. The autostereoscopic optical apparatus of claim 62 wherein said scan pattern comprises concentric circles.

69. The autostereoscopic optical apparatus of claim 62 wherein said optical waveguide comprises an optical fiber.

70. The autostereoscopic optical apparatus of claim 62 wherein said actuator is piezoelectric.

71. The autostereoscopic optical apparatus of claim 62 wherein said actuator is electromagnetic.

72. The autostereoscopic optical apparatus of claim 62 wherein said actuator is electrodynamic.

73. The autostereoscopic optical apparatus of claim 62 wherein said actuator comprises a motor.

74. The autostereoscopic optical apparatus of claim 62 wherein said curved surface comprises a coating.

75. The autostereoscopic optical apparatus of claim 62 wherein said curved surface is ground to provide diffusive characteristics.

76. The autostereoscopic optical apparatus of claim 62 wherein said curved surface is etched to provide diffusive characteristics.

77. The autostereoscopic optical apparatus of claim 62 wherein said optical relay element comprises a fiber optic faceplate.

78. The autostereoscopic optical apparatus of claim 62 wherein, for said left image generation system, said ball lens assembly and said curved surface share, optically, the same center of curvature.

79. The autostereoscopic optical apparatus of claim 62 wherein, for said right image generation system, said ball lens assembly and said curved surface share, optically, the same center of curvature.

80. The autostereoscopic optical apparatus of claim 62 wherein said left ball lens assembly further comprises at least one meniscus lens.

81. The autostereoscopic optical apparatus of claim 62 wherein said right ball lens assembly further comprises at least one meniscus lens.

82. The autostereoscopic optical apparatus of claim 62 wherein said left ball lens assembly comprises a refractive liquid.

83. The autostereoscopic optical apparatus of claim 62 wherein said right ball lens assembly comprises a refractive liquid.

84. The autostereoscopic optical apparatus of claim 62 wherein said left ball lens assembly comprises a plastic lens element.

85. The autostereoscopic optical apparatus of claim 62 wherein said right ball lens assembly comprises a plastic lens element.

86. The autostereoscopic optical apparatus of claim 62 wherein said reflective means comprises a plurality of mirror segments.

87. The autostereoscopic optical apparatus of claim 62 wherein said reflective means comprises a replicated mirror.

88. The autostereoscopic optical apparatus of claim 62 wherein said reflective means comprises a stretched membrane.

89. The autostereoscopic optical apparatus of claim 62 wherein said reflective means comprises a Fresnel mirror.

90. The autostereoscopic optical apparatus of claim 70 further comprising a beamsplitter disposed to fold the optical path from said left ball lens assembly in order to form said second intermediate curved image from said left image generation system near a front focal surface of said reflective means and to fold the optical path from said right ball lens assembly in order to form said second intermediate curved image from said right image generation system near said front focal surface of said reflective means in order to form said stereoscopic virtual image thereby.

91. A substantially monocentric autostereoscopic optical apparatus for displaying a multicolor stereoscopic virtual image comprising a left image to be viewed by an observer at a left viewing pupil and a right image to be viewed by the observer at a right viewing pupil, the apparatus comprising:

(a) a left image generation system and, similarly constructed, a right image generation system, wherein each left and right image generation system forms a first intermediate curved multicolor image comprising an array of image pixels, with each image generation system comprising:

(a1) a first light source for emitting modulated light having a first color as a first series of image pixels arranged according to a scan pattern;

(a2) a second light source for emitting modulated light having a second color as a second series of image pixels arranged according to said scan pattern;

(a3) a third light source for emitting modulated light having a third color as a third series of image pixels arranged according to said scan pattern;

(a4) an optical waveguide coupled to said first light source and coupled to said second light source and coupled to said third light source, said optical waveguide having a flexible output end for deflection, said output end emitting a modulated multicolor light comprising said modulated light having said first, said second, and said third colors;

(a5) an actuator for deflecting said flexible output end of said optical waveguide according to said scan pattern;

(a6) a curved surface for forming said first intermediate curved image thereon by receiving said modulated multicolor light emitted from said output end of said optical waveguide as deflected by said actuator according to said scan pattern;

(a7) an optical relay element for relaying, onto said curved surface, said modulated multicolor light emitted from said flexible output end of said optical waveguide according to said scan pattern, forming said first intermediate curved multicolor image thereby;

(b) a left ball lens assembly for projecting said first intermediate curved multicolor image from said left image generation system to form a second intermediate curved multicolor image from said left image generation system, said left ball lens assembly having a left ball lens pupil;

(c) a right ball lens assembly for projecting said first intermediate curved multicolor image from said right image generation system to form a second intermediate curved multicolor image from said right image generation system, said right ball lens assembly having a right ball lens pupil;

(d) a curved mirror disposed to form a real image of said left ball lens pupil at said left viewing pupil and to form a real image of said right ball lens pupil at said right viewing pupil; and wherein said curved mirror forms said multicolor stereoscopic virtual image from said second intermediate curved multicolor image from said left image generation system and from said second intermediate curved multicolor image from said right image generation system.

92. The autostereoscopic optical apparatus of claim 91 wherein said first light source is a laser.

93. The autostereoscopic optical apparatus of claim 91 wherein said first light source is red.

94. The autostereoscopic optical apparatus of claim 91 wherein said second light source is blue.

95. The autostereoscopic optical apparatus of claim 91 wherein said third light source is green.

96. The autostereoscopic optical apparatus of claim 91 wherein said scan pattern is rectilinear.

97. The autostereoscopic optical apparatus of claim 91 wherein said scan pattern is spiral.

98. The autostereoscopic optical apparatus of claim 91 wherein said scan pattern is radial.

99. The autostereoscopic optical apparatus of claim 91 wherein said scan pattern comprises concentric circles.

100. The autostereoscopic optical apparatus of claim 91 wherein said optical waveguide comprises an optical fiber.

101. The autostereoscopic optical apparatus of claim 91 wherein said actuator is piezoelectric.

102. The autostereoscopic optical apparatus of claim 91 wherein said actuator is electromagnetic.

103. The autostereoscopic optical apparatus of claim 91 wherein said actuator is electrodynamic.

104. The autostereoscopic optical apparatus of claim 91 wherein said actuator comprises a motor.

105. The autostereoscopic optical apparatus of claim 91 wherein said curved surface comprises a coating.

106. The autostereoscopic optical apparatus of claim 91 wherein said curved surface is ground to provide diffusive characteristics.

107. The autostereoscopic optical apparatus of claim 91 wherein said curved surface is etched to provide diffusive characteristics.

108. The autostereoscopic optical apparatus of claim 91 wherein said optical relay element comprises a fiber optic faceplate.

109. The autostereoscopic optical apparatus of claim 91 wherein, for said left image generation system, said ball lens assembly and said curved surface share, optically, essentially the same center of curvature.

110. The autostereoscopic optical apparatus of claim 91 wherein, for said right image generation system, said ball lens assembly and said curved surface share, optically, essentially the same center of curvature.

111. The autostereoscopic optical apparatus of claim 91 wherein said left ball lens assembly further comprises at least one meniscus lens.

112. The autostereoscopic optical apparatus of claim 91 wherein said right ball lens assembly further comprises at least one meniscus lens.

113. The autostereoscopic optical apparatus of claim 91 wherein said left ball lens assembly comprises a refractive liquid.

114. The autostereoscopic optical apparatus of claim 91 wherein said right ball lens assembly comprises a refractive liquid.

115. The autostereoscopic optical apparatus of claim 91 wherein said left ball lens assembly comprises a plastic lens element.

116. The autostereoscopic optical apparatus of claim 91 wherein said right ball lens assembly comprises a plastic lens element.

117. The autostereoscopic optical apparatus of claim 91 wherein said curved mirror comprises a plurality of mirror segments.

118. The autostereoscopic optical apparatus of claim 91 wherein said curved mirror comprises a replicated mirror.

119. The autostereoscopic optical apparatus of claim 91 wherein said curved mirror is essentially spherical.

120. The autostereoscopic optical apparatus of claim 91 wherein said curved mirror comprises a stretched membrane.

121. The autostereoscopic optical apparatus of claim 91 wherein said curved mirror comprises a Fresnel mirror.

122. The autostereoscopic optical apparatus of claim 91 wherein said curved mirror is toroidal.

123. The autostereoscopic optical apparatus of claim 91 wherein said curved mirror is aspheric.

124. The autostereoscopic optical apparatus of claim 100 further comprising a beamsplitter disposed to fold the optical path from said left ball lens assembly in order to form said second intermediate curved image from said left image generation system near a front focal surface of said curved mirror and to fold the optical path from said right ball lens assembly in order to form said second intermediate curved image from said right image generation system near said front focal surface of said curved mirror in order to form said multicolor stereoscopic virtual image thereby.

125. A substantially monocentric autostereoscopic optical apparatus for displaying a stereoscopic real image comprising a left image to be viewed by an observer at a left viewing pupil and a right image to be viewed by the observer at a right viewing pupil, the apparatus comprising:

(a) a left image generation system and, similarly constructed, a right image generation system, wherein each left and right image generation system forms a first intermediate curved image comprising an array of image pixels, with each image generation system comprising:

(a1) a light source for emitting modulated light as a series of image pixels arranged according to a scan pattern;

(a2) an optical waveguide having an input end coupled to said light source and a flexible output end for deflection, said output end emitting said modulated light;

(a3) an actuator for deflecting said flexible output end of said optical waveguide according to said scan pattern;

(a4) a curved surface for forming said first intermediate curved image thereon by receiving said modulated light emitted from said output end of said optical waveguide as deflected by said actuator according to said scan pattern;

(a5) an optical relay element for relaying, onto said curved surface, said modulated light emitted from said flexible output end of said optical waveguide according to said scan pattern, forming said first intermediate curved image thereby;

(b) a left ball lens assembly for projecting said first intermediate curved image from said left image generation system, said left ball lens assembly having a left ball lens pupil;

(c) a right ball lens assembly for projecting said first intermediate curved image from said right image generation system, said right ball lens assembly having a right ball lens pupil;

(d) a retroreflective surface disposed to form, in cooperation with a beamsplitter, a real image of said left ball lens pupil at said left viewing pupil and to form a real image of said right ball lens pupil at said right viewing pupil; and said retroreflective surface forming said stereoscopic real image from said first intermediate curved image from said left image generation system and from said first intermediate curved image from said right image generation system.

126. The autostereoscopic optical apparatus of claim 125 wherein said light source is a laser.

127. The autostereoscopic optical apparatus of claim 125 wherein said light source provides white light.

128. The autostereoscopic optical apparatus of claim 125 wherein said scan pattern is rectilinear.

129. The autostereoscopic optical apparatus of claim 125 wherein said scan pattern is spiral.

130. The autostereoscopic optical apparatus of claim 125 wherein said scan pattern is radial.

131. The autostereoscopic optical apparatus of claim 125 wherein said scan pattern comprises concentric circles.

132. The autostereoscopic optical apparatus of claim 125 wherein said optical waveguide comprises an optical fiber.

133. The autostereoscopic optical apparatus of claim 125 wherein said actuator is piezoelectric.

134. The autostereoscopic optical apparatus of claim 125 wherein said actuator is electromagnetic.

135. The autostereoscopic optical apparatus of claim 125 wherein said actuator is electrodynamic.

136. The autostereoscopic optical apparatus of claim 125 wherein said actuator comprises a motor.

137. The autostereoscopic optical apparatus of claim 125 wherein said curved surface comprises a coating.

138. The autostereoscopic optical apparatus of claim 125 wherein said curved surface is ground to provide diffusive characteristics.

139. The autostereoscopic optical apparatus of claim 125 wherein said curved surface is etched to provide diffusive characteristics.

140. The autostereoscopic optical apparatus of claim 125 wherein said optical relay element comprises a fiber optic faceplate.

141. The autostereoscopic optical apparatus of claim 125 wherein, for said left image generation system, said ball lens assembly and said curved surface share, optically, substantially the same center of curvature.

142. The autostereoscopic optical apparatus of claim 125 wherein, for said right image generation system, said ball lens assembly and said curved surface share, optically, substantially the same center of curvature.

143. The autostereoscopic optical apparatus of claim 125 wherein said left ball lens assembly further comprises at least one meniscus lens.

144. The autostereoscopic optical apparatus of claim 125 wherein said right ball lens assembly further comprises at least one meniscus lens.

145. The autostereoscopic optical apparatus of claim 125 wherein said left ball lens assembly comprises a refractive liquid.

146. The autostereoscopic optical apparatus of claim 125 wherein said right ball lens assembly comprises a refractive liquid.

147. The autostereoscopic optical apparatus of claim 125 wherein said left ball lens assembly comprises a plastic lens element.

148. The autostereoscopic optical apparatus of claim 125 wherein said right ball lens assembly comprises a plastic lens element.

149. The autostereoscopic optical apparatus of claim 125 wherein said retroreflective surface is essentially spherical.

150. The autostereoscopic optical apparatus of claim 125 wherein said retroreflective surface is essentially cylindrical.

151. A method for display of a stereoscopic virtual image to an observer, the virtual image comprising a left image to be viewed by the observer at a left viewing pupil and a right image to be viewed by the observer at a right viewing pupil, the method comprising the steps of:

(a) forming a second left intermediate curved image near the focal surface of a curved mirror with the steps of:
  (a1) emitting a left modulated light as a series of image pixels arranged according to a left scan pattern;
  (a2) directing said left modulated light through a left optical waveguide having a left output end for emitting said left modulated light, said left output end flexible for deflection;
  (a3) actuating said left output end according to said left scan pattern and relaying said left modulated light emitted from said left output end toward a left curved surface in order to form a first left intermediate curved image on said left curved surface, the center of curvature of said left curved surface substantially coincident with the center of curvature of a left ball lens, said left ball lens having a left ball lens pupil;
  (a4) projecting said first left intermediate curved image by said left ball lens to form said second left intermediate curved image near the focal surface of said curved mirror;

(b) forming a second right intermediate curved image near the focal surface of said curved mirror with the steps of:
  (b1) emitting a right modulated light as a series of image pixels arranged according to a right scan pattern;
  (b2) directing said right modulated light through a right optical waveguide having a right output end for emitting said right modulated light, said right output end flexible for deflection;

(b3) actuating said right output end according to said right scan pattern and relaying said right modulated light emitted from said right output end toward a right curved surface in order to form a first right intermediate curved image on said right curved surface, the center of curvature of said right curved surface substantially coincident with the center of curvature of a right ball lens, said right ball lens having a right ball lens pupil;

(b4) projecting said first right intermediate curved image by said right ball lens to form said second right intermediate curved image near the focal surface of said curved mirror;

(c) forming a left virtual image from said second left intermediate curved image said left virtual image viewable from said left viewing pupil, said left viewing pupil formed by said curved mirror as an image of said left ball lens pupil; and (d) forming a right virtual image from said second right intermediate curved image, said right virtual image viewable from said right viewing pupil, said right viewing pupil formed by said curved mirror as an image of said right ball lens pupil.

152. The method of claim 151 wherein the step of projecting said first left intermediate curved image employs a beamsplitter cooperating with said curved mirror to image said left ball lens pupil as said left viewing pupil.

153. The method of claim 151 wherein the step of projecting said first right intermediate curved image employs a beamsplitter cooperating with said curved mirror to image said right ball lens pupil as said right viewing pupil.

154. The method of claim 151 further comprising the step of adjusting the displacement distance between said left ball lens and said right ball lens in order to adapt to an interocular distance of said observer.

155. The method of claim 151 wherein the step of actuating said left output end comprises the step of actuating a piezoelectric element coupled with said left output end.

156. The method of claim 151 wherein the step of actuating said right output end comprises the step of actuating a piezoelectric element coupled with said right output end.

157. The method of claim 151 wherein said left scan pattern is rectilinear.

158. The method of claim 151 wherein said left scan pattern is spiral.

159. The method of claim 151 wherein said left scan pattern is radial.

160. The method of claim 151 wherein said left scan pattern comprises concentric circles.

161. The method of claim 151 wherein said right scan pattern is rectilinear.

162. The method of claim 151 wherein said right scan pattern is spiral.

163. The method of claim 151 wherein said right scan pattern is radial.

164. The method of claim 151 wherein said right scan pattern comprises concentric circles.

165. The method of claim 151 wherein the step of forming a second left intermediate curved image further comprises the step of controlling said left scan pattern by adjusting an actuator signal.

166. The method of claim 151 further comprising the step of adjusting the sequence of emitting left modulated light to change a dimension of said first left intermediate curved image.

167. A method for display of a stereoscopic real image to an observer, the real image comprising a left image to be viewed by the observer at a left viewing pupil and a right image to be viewed by the observer at a right viewing pupil, the method comprising the steps of:

(a) projecting a left image onto a retroreflective surface with the steps of:
    (a1) emitting a left modulated light as a series of image pixels arranged according to a left scan pattern;
    (a2) directing said left modulated light through a left optical waveguide having a left output end for emitting said left modulated light, said left output end flexible for deflection;
    (a3) deflecting said left output end according to said left scan pattern and projecting said left modulated light emitted from said left output end toward said retroreflective surface;

(b) projecting a right image onto said retroreflective surface with the steps of:
    (b1) emitting a right modulated light as a series of image pixels arranged according to a right scan pattern;
    (b2) directing said right modulated light through a right optical waveguide having a right output end for emitting said right modulated light, said right output end flexible for deflection; and
    (b3) deflecting said right output end according to said right scan pattern and projecting said right modulated light emitted from said right output end toward said retroreflective surface.

168. The method of claim 167 wherein the step of projecting said left modulated light toward said retroreflective surface comprises the step of projecting said left modulated light through a left ball lens.

169. The method of claim 167 wherein the step of projecting said right modulated light toward said retroreflective surface comprises the step of projecting said right modulated light through a right ball lens.

170. The method of claim 167 wherein the step of projecting said left modulated light further comprises the step of forming a left intermediate image onto a left diffusive surface for projection.

171. The method of claim 167 wherein the step of projecting said right modulated light further comprises the step of forming a right intermediate image onto a right diffusive surface for projection.

* * * * *